US012605862B2

(12) United States Patent
Kuhn et al.

(10) Patent No.: US 12,605,862 B2
(45) Date of Patent: Apr. 21, 2026

(54) MIXER, SYSTEM FOR APPLYING A BUILDING MATERIAL AND METHOD FOR PRODUCING A STRUCTURE FROM BUILDING MATERIAL

(71) Applicant: SIKA TECHNOLOGY AG, Baar (CH)

(72) Inventors: Patrik Kuhn, Zürich (CH); Armin Brühwiler, Bütschwil (CH); Raphael Bourquin, Stadel (CH); Didier Lootens, Küssnacht (CH); Luka Oblak, Zürich (CH)

(73) Assignee: SIKA TECHNOLOGY AG, Baar (CH)

(*) Notice: Subject to any disclaimer, the term of this patent is extended or adjusted under 35 U.S.C. 154(b) by 46 days.

(21) Appl. No.: 18/439,961

(22) Filed: Feb. 13, 2024

(65) Prior Publication Data

US 2024/0181676 A1 Jun. 6, 2024

Related U.S. Application Data

(62) Division of application No. 16/075,766, filed as application No. PCT/EP2017/054824 on Mar. 1, 2017, now Pat. No. 12,064,901.

(30) Foreign Application Priority Data

Mar. 1, 2016 (EP) .................................... 16158056

(51) Int. Cl.
*B28C 5/14* (2006.01)
*B01F 23/64* (2022.01)
(Continued)

(52) U.S. Cl.
CPC .............. *B28C 5/148* (2013.01); *B01F 23/64* (2022.01); *B01F 27/0724* (2022.01);
(Continued)

(58) Field of Classification Search
CPC ........... B28C 5/14; B28C 5/141; B28C 5/142; B28C 5/145; B28C 5/148; B28B 1/001;
(Continued)

(56) References Cited

U.S. PATENT DOCUMENTS 3,924,835 A 12/1975 Hohnfeld et al.
4,117,547 A 9/1978 Mathis et al.
(Continued)

FOREIGN PATENT DOCUMENTS

CN 203268729 U 11/2013
CN 104023925 A 9/2014
(Continued)

OTHER PUBLICATIONS

Aug. 9, 2017 International Search Report issued in International Patent Application No. PCT/EP2017/054824.
(Continued)

*Primary Examiner* — Michael P Wieczorek
(74) *Attorney, Agent, or Firm* — Oliff PLC

(57) ABSTRACT

A mixer (1) comprises a drum (2) having at least one inlet (6) and one outlet (7). The mixer (1) furthermore comprises a drive (3) and a stirring shaft (4), which is arranged in the drum (2) and is coupled to the drive (3). Furthermore, the mixer (1) comprises a conveying device (5), which is arranged in the drum (2) and which is arranged on one and the same axis as the stirring shaft (4).

17 Claims, 3 Drawing Sheets

(51) Int. Cl.

| | |
|---|---|
| ***B01F 27/072*** | (2022.01) |
| ***B01F 27/112*** | (2022.01) |
| ***B01F 27/1121*** | (2022.01) |
| ***B01F 27/192*** | (2022.01) |
| ***B01F 27/2123*** | (2022.01) |
| ***B01F 27/70*** | (2022.01) |
| ***B01F 35/71*** | (2022.01) |
| ***B01F 35/75*** | (2022.01) |
| ***B01F 101/28*** | (2022.01) |
| ***B28B 1/00*** | (2006.01) |
| ***B28C 5/08*** | (2006.01) |

(52) U.S. Cl.

CPC ...... *B01F 27/0725* (2022.01); *B01F 27/0726* (2022.01); *B01F 27/112* (2022.01); *B01F 27/1121* (2022.01); *B01F 27/192* (2022.01); *B01F 27/2123* (2022.01); *B01F 27/70* (2022.01); *B01F 35/71731* (2022.01); *B01F 35/754551* (2022.01); *B28B 1/001* (2013.01); *B28C 5/0818* (2013.01); *B28C 5/143* (2013.01); *B01F 2101/28* (2022.01)

(58) Field of Classification Search

CPC ............. B28B 13/0275; B28B 13/0215; B01F 35/71731; B01F 35/754551; B01F 27/192; B01F 27/2123; B01F 27/0725; B01F 27/112; B01F 27/0724; B01F 27/0726; B01F 27/1121; B01F 27/70; B01F 23/64

See application file for complete search history.

(56) References Cited

U.S. PATENT DOCUMENTS

| | | | | |
|---|---|---|---|---|
| 4,205,919 | A | 6/1980 | Attwell | |
| 4,778,276 | A | 10/1988 | Meyer et al. | |
| 5,470,147 | A | 11/1995 | Duckworth | |
| 5,609,831 | A | 3/1997 | Kempter | |
| 5,709,466 | A * | 1/1998 | Weszely .................... | B28C 7/04 366/30 |
| 5,785,420 | A | 7/1998 | Schuff | |
| 7,837,378 | B2 * | 11/2010 | Khoshnevis ............ | E04G 11/34 366/139 |
| 2007/0256599 | A1 | 11/2007 | Rigsby et al. | |
| 2014/0252668 | A1 | 9/2014 | Austin et al. | |
| 2015/0266777 | A1 * | 9/2015 | Harper ................ | B28B 19/0007 106/672 |
| 2016/0107396 | A1 | 4/2016 | Berman | |

FOREIGN PATENT DOCUMENTS

| | | | |
|---|---|---|---|
| CN | 104891891 | A | 9/2015 |
| DE | 42 06 116 | A1 | 9/1993 |
| DE | 29817130 | U1 | 12/1998 |
| DE | 202 15 662 | U1 | 1/2003 |
| DE | 102007004768 | A1 | 8/2008 |
| DE | 102011102337 | A1 | 11/2012 |
| EP | 0 017 015 | A1 | 10/1980 |
| EP | 0 300 342 | A2 | 1/1989 |
| EP | 0 584 573 | A1 | 3/1994 |
| EP | 0 824 035 | A2 | 2/1998 |
| EP | 1 023 978 | A1 | 8/2000 |
| FR | 2499453 | A1 | 8/1982 |
| JP | S60-132836 | U | 9/1985 |
| JP | S62-062709 | A | 3/1987 |
| JP | H02-062205 | A | 3/1990 |
| JP | H03-186334 | A | 8/1991 |
| JP | H05-345122 | A | 12/1993 |
| JP | 2000-327445 | A | 11/2000 |
| JP | 2006-515908 | A | 6/2006 |
| JP | 2015-502870 | A | 1/2015 |
| KR | 10-2011-0034186 | A | 4/2011 |
| KR | 10-1029850 | B1 | 4/2011 |
| KR | 2015-0138608 | A | 12/2015 |
| WO | 97/47447 | A1 | 12/1997 |
| WO | 2004/065707 | A2 | 8/2004 |
| WO | 2007/066362 | A1 | 6/2007 |
| WO | 2009/030999 | A1 | 3/2009 |
| WO | 2013/064826 | A1 | 5/2013 |
| WO | 2015/087214 | A1 | 6/2015 |
| WO | 2016/016887 | A1 | 2/2016 |

OTHER PUBLICATIONS

Septemer 13, 2018 International Preliminary Report on Patentability issued in International Patent Application No. PCT/EP2017/054824.

Nov. 2, 2018 Office Action issued in Vietnamese Patent Application No. 1-2018-04245.

Aug. 27, 2018 Office Action issued in Chilean Patent Application No. 201802448.

Aug. 5, 2019 Office Action issued in Chilean Patent Application No. 201802448.

Jan. 28, 2020 Search Report and Written Opinion issued in Singaporean Patent Application No. 11201807491S.

Feb. 25, 2020 Office Action issued in European Patent Application No. 17 707 571.0.

Jan. 22, 2020 Office Action issued in Colombian Patent Application No. 2018/0010008.

Apr. 9, 2020 Office Action issued in Russian Patent Application No. 2018125991/05(041215).

May 27, 2020 Office Action issued in Colombian Patent Application No. NC2018/0010008.

* cited by examiner

MIXER, SYSTEM FOR APPLYING A BUILDING MATERIAL AND METHOD FOR PRODUCING A STRUCTURE FROM BUILDING MATERIAL

CROSS-REFERENCE TO RELATED APPLICATIONS

This application is a divisional application of U.S. patent application Ser. No. 16/075,766, which was filed on Aug. 6, 2018 as a national stage application of PCT/EP2017/054824, which was filed on Mar. 1, 2017. These prior applications are hereby incorporated by reference herein in their entireties.

TECHNICAL FIELD

The present invention relates to a mixer and to a method for producing a structure from building material using a mixer.

BACKGROUND

In order to mix different components, which may be for example solid, liquid or pulverulent, use is conventionally made of mixers having a drum, in which a stirring shaft is arranged, which can be driven by a drive. The stirring shaft can be equipped for example with pegs, such that, during a rotary movement of the stirring shaft, the mix is moved and mixed. Such a mixer is presented for example in the laid-open specification WO 2007/066362 A1. In said horizontal continuous mixer, the material to be mixed is guided into the drum via an inlet, is mixed in the drum by pegs on the stirring shaft, and finally discharged from the drum again via a lateral outlet. The pegs on the stirring shaft of such a mixer can in this case be designed and arranged such that the mix is moved in a predetermined direction in the drum by the pegs. However, it has been found that such a movement of the mix through the drum of the mixer functions well enough only at particular viscosities of the mix. In particular in the case of highly viscous mixes, the conveying of the mix to an outlet of the mixer is insufficient in such a system. As a result, the mixer can be clogged thereby and its function is impaired.

It is therefore an object of the present invention to avoid the drawbacks of the known devices. In this case, a mixer is intended to be made available which can continuously mix and convey even materials with a relatively high viscosity. The mixer is also intended to be easy to handle and cost-effective to operate.

The object is first of all achieved by a mixer comprising a drum having at least one inlet and one outlet. The mixer furthermore comprises a drive and a stirring shaft for mixing a mix, wherein the stirring shaft, arranged in the drum, is coupled to the drive. Furthermore, the mixer comprises a conveying device, which is arranged in the drum and which is arranged on one and the same axis as the stirring shaft.

This solution affords the advantage that, as a result, even mixes with a relatively high viscosity can be continuously mixed and conveyed. For example, for the mixing of pumpable concrete with concrete admixtures, it is desirable for the mix to achieve a particular viscosity in order as a result to be able to be used directly for the production of a concrete structure. The conveying device according to the invention in the mixer also makes it possible, for such applications, for the material to be mixed to be conveyed continuously and directly from an inlet of the drum to an outlet of the drum, without the mixer being blocked by mixes of relatively high viscosity in the process and as a result malfunctioning.

In one advantageous embodiment, the conveying device is arranged in a manner directly adjoining the stirring shaft such that the mix mixed by the stirring shaft is able to be collected directly by the conveying device and is able to be conveyed out of the drum through the outlet.

This has the advantage that, as a result, mixes with a high or greatly increasing viscosity are able to be conveyed because, as a result of the arrangement of the conveying device directly adjoining the stirring shaft, the mix is conveyed immediately out of the drum and so any blocking of the mixer by the mix can be prevented.

In one advantageous exemplary embodiment, the stirring shaft is equipped with pegs such that, while the stirring shaft rotates, a mix in the drum is moved by the pegs. This has the advantage that, as a result, efficient and homogeneous mixing of the different components can be achieved. Furthermore, a specific arrangement and configuration of the pegs can influence both mixing and conveying of the mix in the drum.

Such stirring shafts having pegs are suitable in particular for mixing components with large grain sizes, for example grain sizes of 2 to 10 mm. These can be for example aggregates such as stones, gravel or sand. In addition, such a mixer is also suitable for mixing asymmetrical substances, for example mixes having fiber admixtures (for example carbon fibers, metal fibers or synthetic fibers).

In an alternative exemplary embodiment, the stirring shaft is not equipped with pegs but is configured for example as a helical stirrer, disk stirrer or inclined-blade stirrer.

In one advantageous exemplary embodiment, the conveying device and the stirring shaft are arranged on one and the same driveshaft, wherein said driveshaft is drivable by the drive. This has the advantage of resulting in a cost-effective and robust device.

In an alternative exemplary embodiment, the conveying device and the stirring shaft are arranged on two separate driveshafts, wherein the conveying device is arranged on a first driveshaft and the stirring shaft is arranged on a second driveshaft, with the result that the conveying device and stirring shaft are drivable at different speeds. Such an arrangement has the advantage that, as a result, the mixing and conveying of the mix can be set separately from one another. In this way, for each particular purpose, optimum mixing and conveying can be achieved through a specifically adaptable mixing rate and conveying rate. For example, for a first application, slight mixing with a simultaneously high conveying rate and/or conveying at high pressure may be advantageous, and for a second application, intensive mixing with a simultaneously low conveying rate and/or conveying at low pressure may be advantageous.

In one advantageous exemplary embodiment, the stirring shaft and the conveying device are arranged next to one another in the drum, wherein the stirring shaft is arranged in a first drum section and the conveying device is arranged in a second drum section, and wherein the inlet is arranged in the first drum section and the outlet is arranged in the second drum section.

In one advantageous development, the first drum section with the stirring shaft arranged therein forms between 50% and 90%, preferably between 60% and 85%, particularly preferably between 70% and 80%, of a volume of the drum. It has been found that, as a result of such a division of the drum, an optimum mixing rate with a desired conveying rate of the mixer can be achieved.

In one advantageous exemplary embodiment, the conveying element is configured as a screw conveyor. In one advantageous development, the screw conveyor has at least one, preferably at least two turns. Such a screw conveyor has the advantage that, as a result, even highly viscous mixes can be conveyed in the drum and, in addition, can be conveyed out of the drum through the outlet at a desired pressure.

In one advantageous development, more than two turns can be formed. In addition, the turns can have different extents in the direction of the driveshaft, wherein the turns become tighter toward one end of the conveying device. As a result, a conveying pressure of the conveying device can be changed depending on the orientation of the tightening of the turns.

In a further advantageous development, a cross section of a shaft of the conveying device can be configured in a variable manner in the direction of the driveshaft. In this case, a volume for the mix becomes smaller toward one end of the conveying device. As a result, a conveying pressure of the conveying device can be changed depending on the orientation of the reduction in size of the volume for the mix.

In order to mix a first component and a second component together and to convey them, it is possible for only one inlet or two or more inlets to be arranged on the drum. In this case, the components can for example be combined before they are passed into the drum, or the components can be passed into the drum via separate inlets and only be mixed together once they are in the drum. Depending on the number and arrangement of the inlets, the stirring shaft and any stirring elements arranged thereon, such as pegs, for example, can be configured differently.

In one advantageous exemplary embodiment, the drum comprises a first inlet and a second inlet, wherein a feeding device is arranged at the first inlet. The provision of such a feeding device at one of the inlets has the advantage that, as a result, pulverulent components can be fed to the feeding device in an efficient and controlled manner.

In one advantageous development, the feeding device comprises a hopper for receiving a pulverulent component, a second drive, and a second stirring shaft that is coupled thereto and arranged in the hopper. This has the advantage that, as a result, said pulverulent component can be introduced continuously into the drum of the mixer without clogging.

In one advantageous development, the second stirring shaft comprises radially arranged stirring blades which are arranged in an input region of the hopper, and wherein the second stirring shaft has an axially oriented stirring rod which is radially offset from an axis of rotation of the stirring shaft, said stirring rod being arranged in an output region of the hopper. Such a feeding device affords the advantage that, by way of the stirring blades, the pulverulent component can be conveyed in a controlled manner through an input region of the hopper, wherein, as a result of the radially offset stirring rod, the pulverulent component is prevented from blocking the output region of the hopper. Alternatively, it is also possible for only stirring blades without a stirring rod or a stirring rod without stirring blades to be arranged on the stirring shaft.

In one advantageous embodiment, a component, which is fed to the system via the feeding device, is able to be fed via a gravimetric method. In contrast to a volumetric method, this has the advantage that, as a result, a fed mass of the one component can be set exactly, with the result that a more precise mixing result is achievable.

In one advantageous embodiment, an additional second conveying device is arranged in the drum on the same axis as the stirring shaft and the conveying device, in order to carry a first component introduced into the drum via the inlet away from the inlet before the first component is mixed with further components.

This is advantageous in particular when pulverulent components are introduced into the drum via the inlet, because these are advantageously intended to be mixed with further components in a section away from the inlet, in order to avoid clogging of the inlet.

Furthermore, a system for applying a construction material is proposed, wherein the system comprises a moving device, a first component and a second component. Furthermore, the system comprises a mixer for mixing the first component and the second component, wherein the mixer is arranged on the moving device and is movable thereby. In this case, the first component and the second component are able to be fed to the mixer in order to produce the construction material. Furthermore, the construction material produced from the components is able to be applied via the outlet of the mixer. The mixer used here is the mixer according to the invention and described herein.

Such a system for applying a construction material affords the advantage that, as a result, it is possible for example for building structures to be built efficiently and cost-effectively. The advantage of the arrangement proposed herein is in particular that the components are mixed together only shortly before the application of the construction material. This is made possible by the fact that the mixer is arranged so as to be movable via the moving device, such that it is able to be moved in each case to that position at which the construction material is intended to be applied. As a result of the direct application of the construction material after the mixing operation, a highly viscous construction material, for example concrete, can be used in the mixer without said highly viscous construction material having to be conveyed onward or processed.

In one advantageous development, the first component is a pumpable building material, for example concrete, and the second component is a pumpable substance which contains a building-material admixture, for example a concrete admixture.

In one advantageous development, the building-material admixture is an accelerating admixture and/or a hardening accelerator.

The use of a pumpable building material and of a building-material admixture affords the advantage that both the pumpable building material and the building-material admixture can be transported easily out of a container to the mixer, wherein, as a result of these two substances being mixed, a highly viscous building material is produced, which can be used directly to produce a building structure.

In one advantageous embodiment, the moving device is configured so as to be movable in the manner of a 3D printer, such that structures are able to be constructed from the construction material using the system.

Such systems of the 3D-printer type afford the advantage that, as a result, entire structures can be produced from building material, for example building walls or the like. In this case, no formwork is necessary and therefore shaping of the structure is also able to be chosen in a substantially freer manner.

Furthermore, a method for producing a structure from building material is proposed, comprising the steps of: mixing a pumpable building material, in particular concrete, and a pumpable substance which contains a building-material admixture, in particular a concrete admixture, with a mixer; and applying the mixture with a moving device.

In one advantageous embodiment, the concrete admixture is an accelerating admixture and/or hardening accelerator.

In one advantageous development, the mixer is operated, during mixing, at a speed of more than 500 revolutions per minute, preferably at a speed of more than 650 revolutions per minute, particularly preferably at a speed of more than 800 revolutions per minute, particularly preferably at a speed of more than 1000 revolutions per minute.

The operating of the mixer at high speeds affords the advantage that, as a result, mixes with a high or rapidly increasing viscosity (for example concrete with accelerating admixture and/or hardening accelerator) can be mixed as efficiently and quickly as possible and subsequently conveyed out of the mixer, without the mixer becoming blocked and malfunctioning.

In addition, such high speeds afford the advantage that, as a result, not only good mixing of the materials can be achieved, but it is also possible, as a result, for structures in the mix to be broken up, which can be desirable for example in the case of pelletized raw materials which have to be broken down and/or broken up.

In tests, pumpable concrete and accelerating admixture and/or hardening accelerator were mixed together at speeds of between 200 and 2000 revolutions per minute. In the process, it was found that, when mixing at speeds of less than 500 revolutions per minute, a homogeneous or smooth mixture is not sufficiently achieved and so the pumpable concrete and the pumpable accelerator are mixed together insufficiently. This resulted in a poorly controllable solidification or hardening behavior, since the insufficiently homogeneous mixture has regions with an above-average amount of admixture and accordingly regions with too little admixture. This can result in blockages in the mixer, and/or in defects in the applied mixture, for example regions with insufficient solidity after a particular time after leaving the mixer.

The tests showed that, as a result of higher speeds, the following effects occur:

Firstly, the concrete and the accelerator are mixed better, resulting in a controllable solidification or hardening behavior.

Secondly, the concrete is broken up more intensively, with the result that the accelerator can act on a larger surface area of the concrete, resulting in a quicker and better controllable reaction between the concrete and accelerator.

Thirdly, more energy is input into the mixture, resulting in greater heating of the concrete and accelerator, thereby again accelerating the solidification or hardening process.

The above-described effects were observed to an increasing extent up to a speed of 2000 revolutions per minute.

In further tests, pumpable concrete to which fibers had been added was mixed with accelerator at different speeds as per the above-described method. In this case, speeds of over 900 revolutions per minute proved to be advantageous because, in this case, in addition to the concrete, the fibers also had to be broken up.

In a further advantageous development, during the application of the mixture with the moving device, an average residence time of the mixture in the drum is less than 10 seconds, preferably less than 7 seconds, particularly preferably less than 4 seconds.

The average residence time of the mixture in the drum is in this case the duration for which a particle stays in the drum (from the inlet of the drum to the outlet of the drum) on average.

An abovementioned advantageous average residence time of at most a few seconds has the advantage that, as a result, a mix with a high or greatly increasing viscosity is able to be conveyed, for example pumpable concrete to which accelerating admixture and/or hardening accelerator has been added.

In one advantageous embodiment, during the application of the mixture, the mixture is applied in a plurality of at least partially superposed layers.

In one advantageous development, during the application, an existing layer is only superposed with a new layer of the mixture when the existing layer is sufficiently solid, in order to retain an original shape.

In one advantageous development, during the application, at least partially superposed layers of the mixture are built up continuously, such that the structure is constructed from building material in the manner of a 3D printer.

Such methods, in which mixture is applied and is subsequently superposed at least partially with mixture by a further application, afford the advantage that, as a result, entire structures made of building material, for example building walls or the like, can be produced. Here, compared with conventional methods, such methods afford the advantage that no formwork is necessary and that, therefore, shaping of the structure is also able to be chosen in a substantially freer manner.

BRIEF DESCRIPTION OF THE DRAWINGS

Details and advantages of the invention are described in the following text on the basis of exemplary embodiments and with reference to schematic drawings, in which.

DETAILED DESCRIPTION

Figure 1:
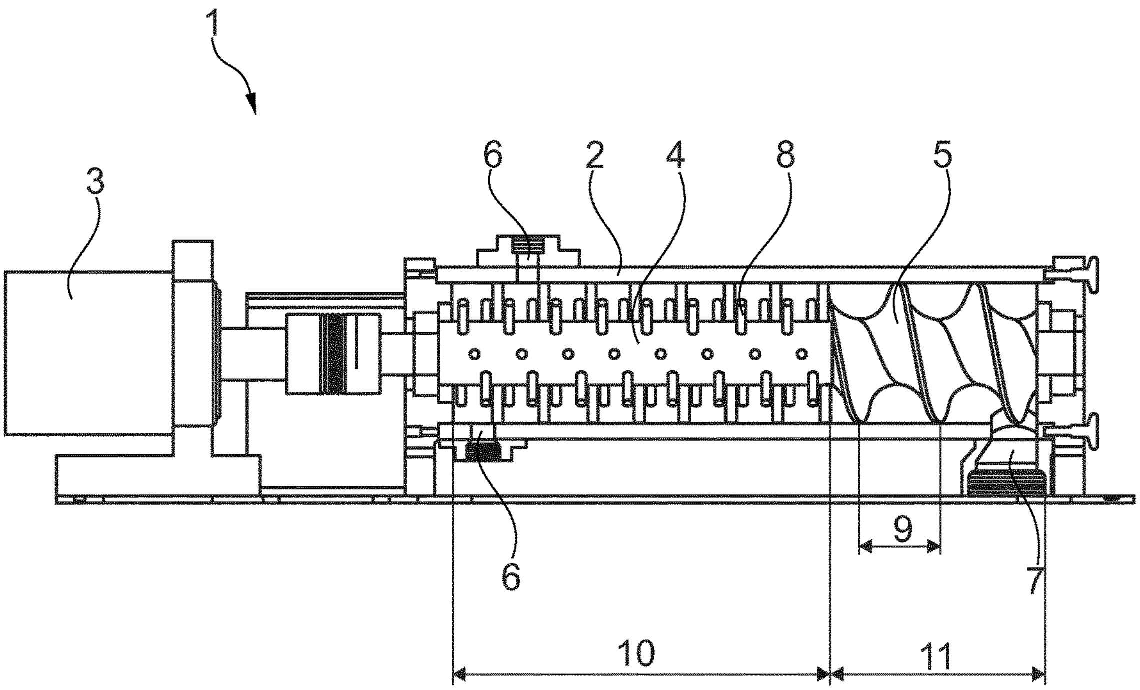
FIG. 1: shows a schematic illustration of an exemplary mixer having a conveying device.

FIG. 1 illustrates an exemplary mixer 1. The mixer 1 has a drive 3, a drum 2, a stirring shaft 4, and a conveying device 5. The drum 2 in this case has two inlets 6 and one outlet 7. The inlets 6 are in this case located in a first drum section 10, in which the stirring shaft is arranged, and the outlet 7 is located in a second drum section 11, in which the conveying device 5 is also arranged.

In this exemplary embodiment, two inlets 6 are arranged on the drum 2. In an alternative exemplary embodiment, which is not illustrated, the drum 2 has only one inlet, however. In this case, the components to be mixed can already be combined before they are conveyed into the drum 2 via the inlet.

In this case, the conveying device 5 is arranged in a manner directly adjoining the stirring shaft 4 such that the mix mixed by the stirring shaft 4 is able to be collected directly by the conveying device 5 and is able to be conveyed out of the drum 2 through the outlet 7.

In this exemplary embodiment, the conveying device 5 is configured as a screw conveyor. The screw conveyor in this exemplary embodiment has two complete turns 9. Depending on the desired conveying rate, the screw conveyor can be dimensioned or configured in some other way. The conveying device 5 and the stirring shaft 4 are arranged on one and the same axis in the drum 2. In this exemplary embodiment, the stirring shaft 4 is equipped with pegs 8 such that, while the stirring shaft rotates, a mix in the drum is moved by the pegs 8.

FIG. 2 again illustrates an exemplary mixer 1. In contrast to the mixer 1 in FIG. 1, in this mixer, a feeding device 12 is arranged at one of the inlets 6. This feeding device 12 is for example suitable for introducing a pulverulent component into the drum 2 of the mixer 1 in a homogeneous manner and without clogging.

Figure 2:
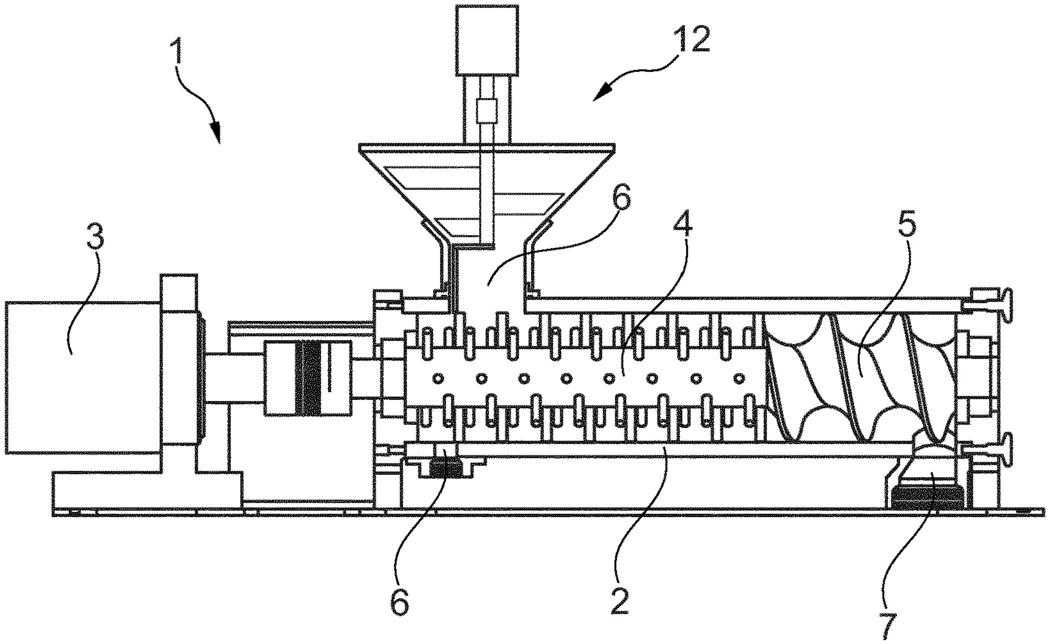
FIG. 2: shows a schematic illustration of an exemplary mixer having a conveying device and having a feeding device via an inlet.
Figure 3A:
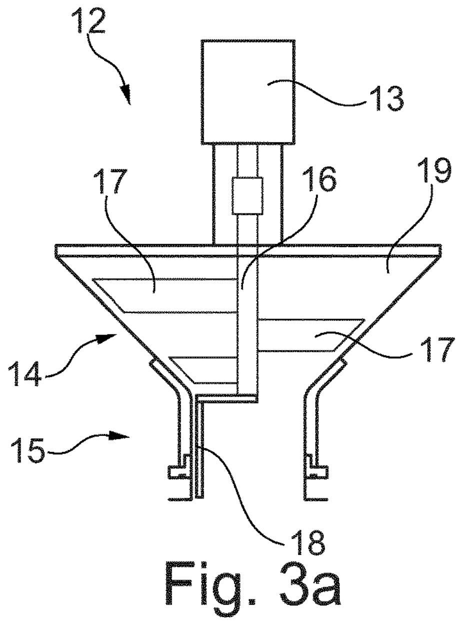
FIG. 3A: shows a schematic illustration of an exemplary feeding device.
Figure 3B:
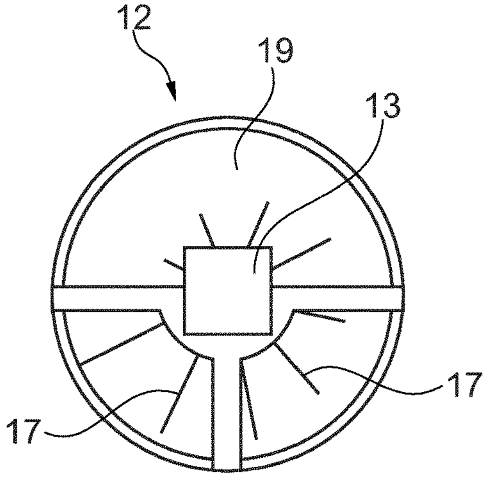
FIG. 3B: shows a schematic illustration of an exemplary feeding device.

FIGS. 3A and 3B illustrate the feeding device 12, which is arranged at one of the inlets 6 in FIG. 2, in more detail. The feeding device 12 has a second drive 13 and a second stirring shaft 16. The second stirring shaft 16 is in this case arranged in a rotatable manner in a hopper 19. The hopper 19 has an input region 14 and an output region 15. In this case, stirring blades 17 on the second stirring shaft are arranged in the input region of the hopper 19, and a stirring rod 18 is arranged on the second stirring shaft 16 in the output region 15 of the hopper 19. The stirring blades 17 are in this case arranged radially on the second stirring shaft, such that they can convey a pulverulent component through the input region 14 of the hopper 19. The stirring rod 18 is oriented axially with respect to the second stirring shaft 16, and is offset radially from an axis of rotation of the stirring shaft 16. As a result, this stirring rod 18 can protect the output region 15 of the hopper 19 from clogging.

Figure 4:
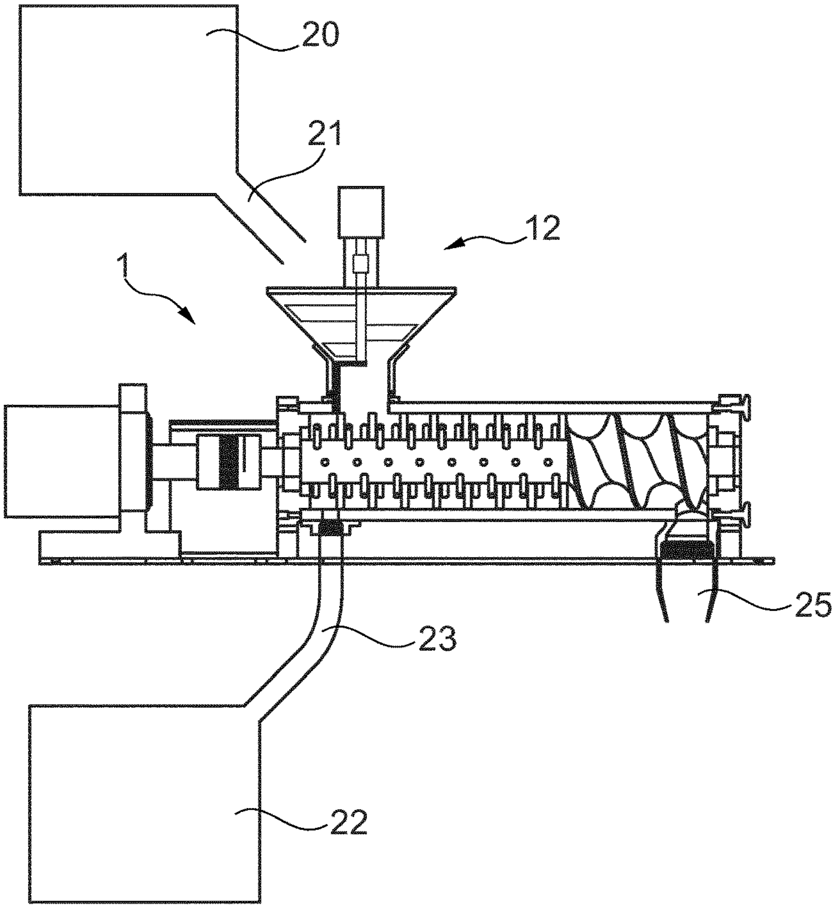
FIG. 4: shows a schematic illustration of a mixer for mixing a first component and a second component.

FIG. 4 again illustrates an exemplary mixer 1 having a feeding device 12 at one of the inlets. A first component 20 and a second component 22 are fed to the mixer 1 via a first feed line 21 and via a second feed line 23, respectively. For example, in this case, the first component 20 can be a pulverulent component, which is fed into the hopper of the feeding device 12 via the first feed line 21, and the second component 22 can be for example a liquid or pumpable substance, which is passed directly into the drum of the mixer 1 via the second feed line 23. After the mixing operation in the drum of the mixer 1, the mixture is conveyed through the outlet 25 of the mixer by the conveying device 5.

Figure 5:
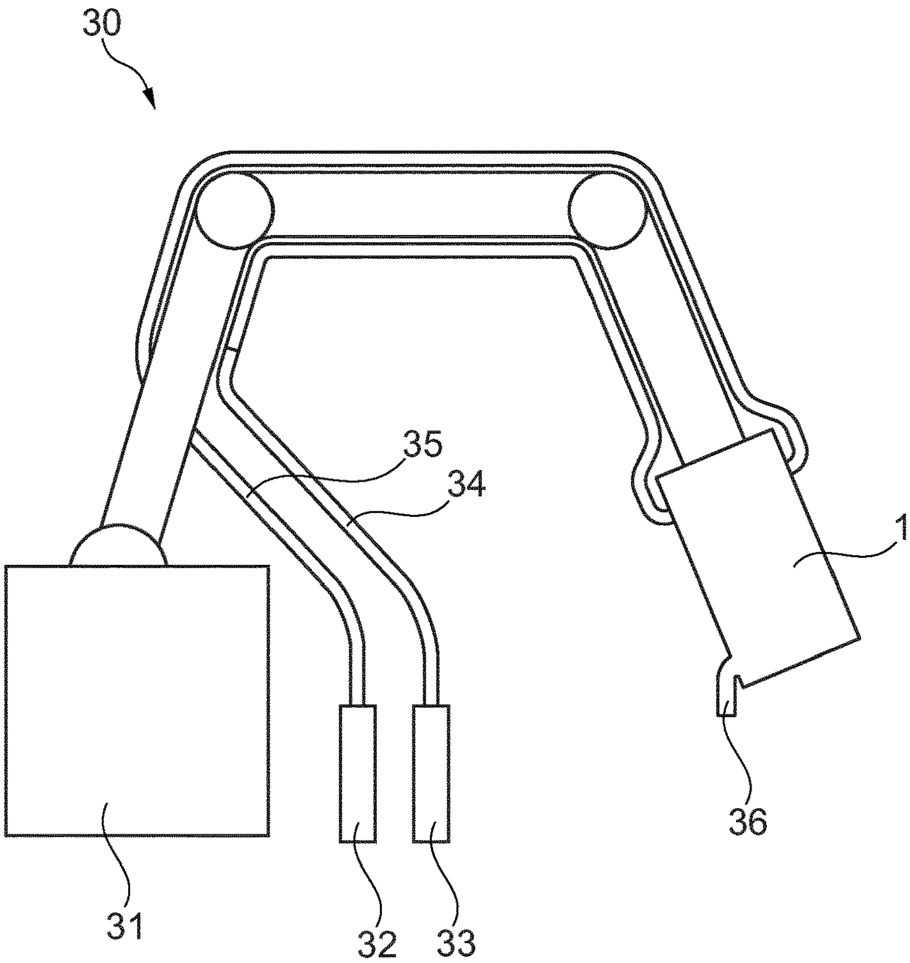
FIG. 5: shows a schematic illustration of an exemplary system for applying a construction material.

FIG. 5 illustrates a system 30 for applying a construction material. The system 30 comprises a moving device 31 and a first component 32 and a second component 33. The first component 32 and the second component 33 are fed to the mixer 1 via a first feed line 34 and a second feed line 35. The mixer 1 comprises an outlet 36, via which the construction material is able to be applied. In order for it to be possible to apply the construction material at a desired location, the mixer 1 is movable by way of the moving device 31. For this purpose, the moving device 31, as illustrated in this exemplary embodiment, can have an arm, which is configured in a movable manner. For example, a multi-joint arm can be used in order to allow more versatile movement of the mixer 1 in space.

In alternative exemplary embodiments, which are not illustrated, the moving device 31 is configured as a crane, a robot, a movable device on wheels or tracks, or a 3D printer.

Figure 6:
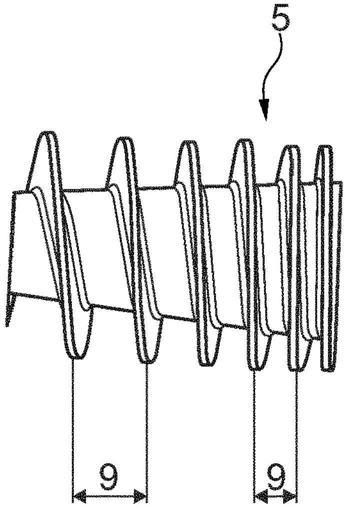
FIG. 6: shows a schematic illustration of an exemplary conveying device.

FIG. 6 illustrates an exemplary embodiment of a conveying device 5. In this example, first of all more than two turns 9 are formed. In addition, the turns 9 have different extents in the direction of the driveshaft, wherein the turns 9 become tighter toward one end of the conveying device 5. As a result, a conveying pressure of the conveying device 5 can be changed depending on the orientation of the tightening of the turns 9.

Furthermore, in this example, a cross section of a shaft of the conveying device 5 is configured to be variable in the direction of the driveshaft. In this case, a volume for the mix becomes smaller toward one end of the conveying device 5. As a result, a conveying pressure of the conveying device 5 can be changed depending on the orientation of the reduction in size of the volume for the mix.

The invention claimed is:

1. A method for producing a structure from a construction material using a moving device having a mixer arranged thereon, the moving device configured to move the mixer of the moving device, the mixer comprising a drum having at least one inlet and at least one outlet, a drive, a stirring shaft for mixing, the stirring shaft being arranged in the drum and coupled to the drive, and a conveying device arranged in the drum, the conveying device being configured as a screw extruder in which turns of the screw extruder become tighter toward one end of the conveying device, the method comprising the steps of:

- feeding a first component that is a pumpable building material to the at least one inlet of the drum;
- feeding a second component that includes at least one of an accelerating admixture and a hardening accelerator to the at least one inlet of the drum;
- mixing the first component and the second component with the stirring shaft to produce the construction material, the mixer being operated at a speed of more than 1000 revolutions per minute during the mixing;
- conveying the construction material toward and through the at least one outlet of the drum with the conveying device, and
- moving the mixer with the moving device to apply the construction material and construct a structure from the construction material.

2. The method of claim 1, wherein the moving device moves the mixer independently in three dimensions to apply the construction material to construct the structure.

3. The method of claim 1, wherein the first component is fed to the at least one inlet by pumping the first component from a first container that includes the first component.

4. The method of claim 3, wherein the second component is fed to the at least one inlet by pumping the second component from a second container that includes the second component.

5. The method according to claim 1, wherein the conveying device directly adjoins the stirring shaft such that the construction material mixed by the stirring shaft is configured to be collected directly by the conveying device and is configured to be conveyed out of the drum through the at least one outlet.

6. The method as claimed in claim 1, wherein, during the applying of the construction material with the moving device, an average residence time of the construction material in the drum is less than 10 seconds.

7. The method as claimed in claim 1, wherein, during the applying of the construction material with the moving device, the construction material is applied in a plurality of at least partially superposed layers.

8. The method as claimed in claim 7, wherein, during the applying, an existing layer is only superposed with a new layer of the construction material when the existing layer is sufficiently solid, in order to retain its original shape.

9. The method as claimed in claim 1, wherein the moving device is a 3D printer.

10. The method as claimed in claim 1, wherein the moving device is configured to move the mixer within a build space for forming the structure constructed from the construction material.

11. The method as claimed in claim 1, wherein the stirring shaft is operated to mix the first component and the second component homogeneously to produce the construction material.

12. The method as claimed in claim 1, wherein the at least one inlet of the drum includes a first inlet and a second inlet, where the first component is fed to the first inlet and the second component is fed to the second inlet.

13. The method as claimed in claim 12, wherein the first inlet and the second inlet are both arranged upstream, in a conveying direction of the construction material, from the conveying device.

14. The method as claimed in claim 1, wherein the pumpable building material is pumpable concrete.

15. The method as claimed in claim 1, wherein the conveying device is arranged on an axis of the stirring shaft.

16. The method as claimed in claim 1, wherein the mixer is operated at a speed of more than 1000 revolutions per minute and less than 2000 revolutions per minute during the mixing.

17. The method as claimed in claim 1, wherein the conveying device is arranged on a first driveshaft, and the stirring shaft is arranged on a second driveshaft that is separate from the first driveshaft.

* * * * *